Feb. 18, 1964    J. AABYE ETAL    3,121,396
ELECTRIC MOTOR-DRIVEN LIQUID PUMPS
Filed Oct. 11, 1960    2 Sheets-Sheet 2
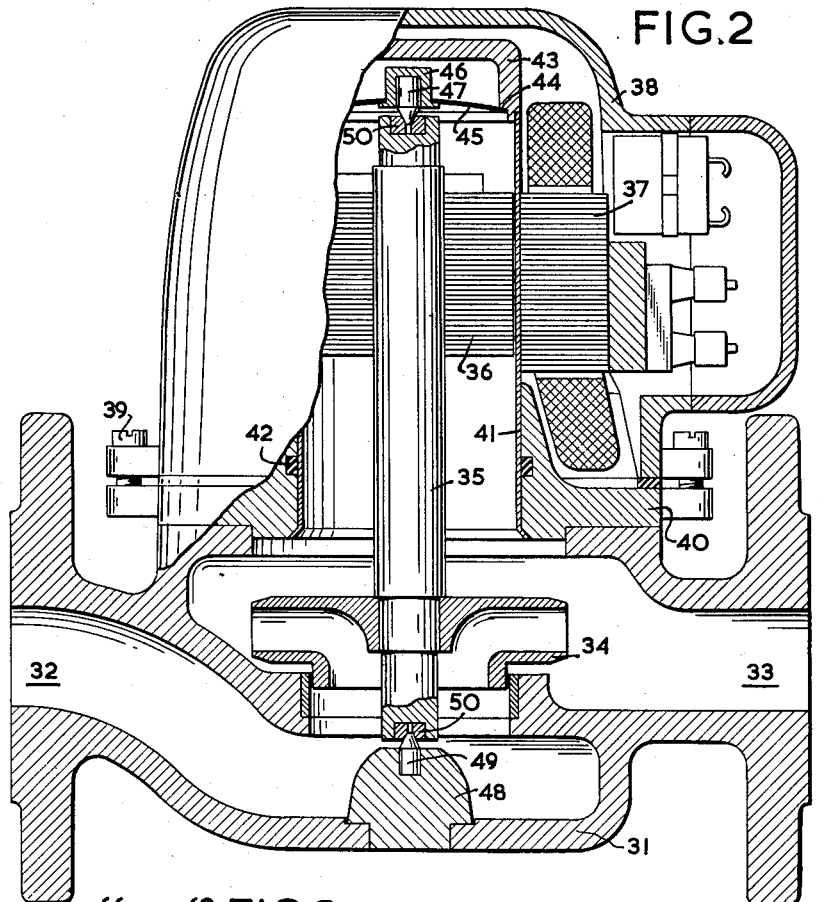
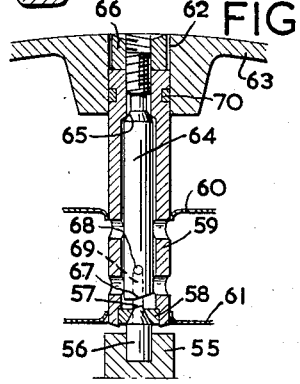
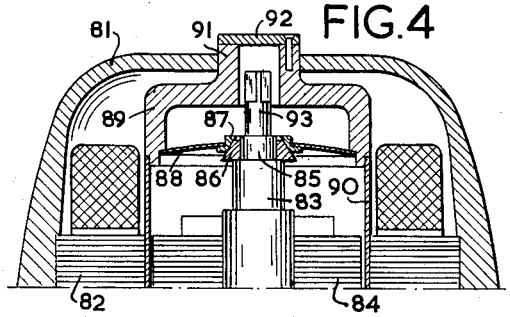
INVENTORS
Jørgen Aabye
Einar Ove Christensen
BY Stevens Davis Miller & Mosher
ATTORNEYS

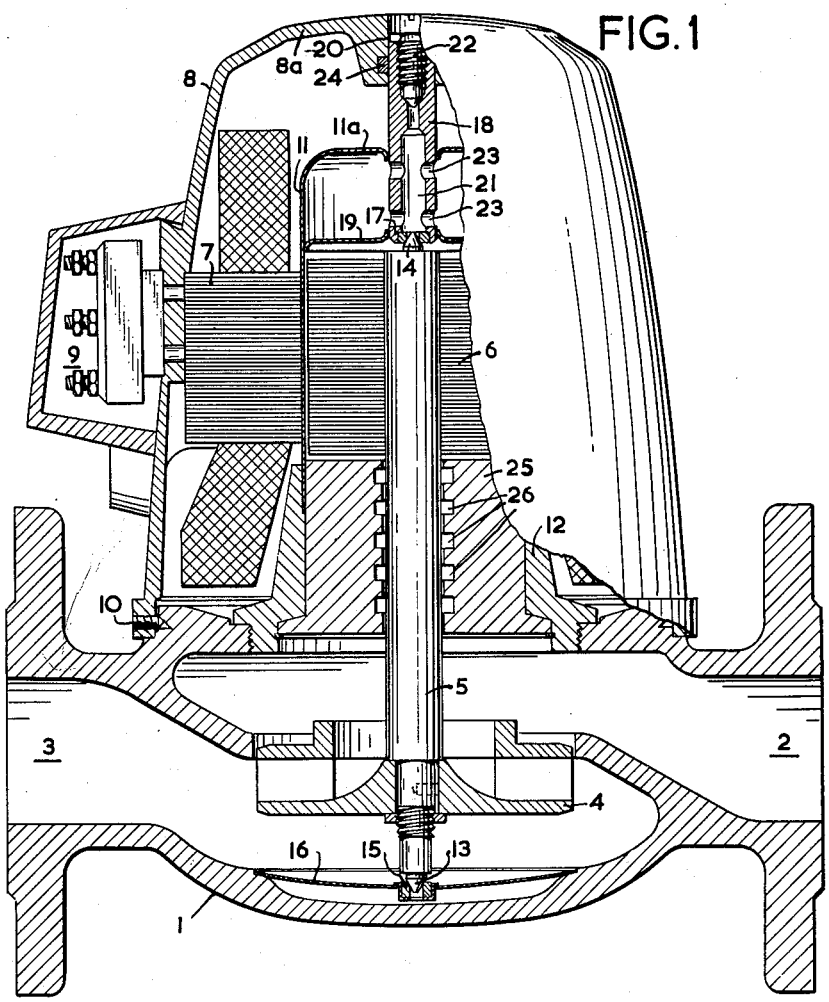

3,121,396
ELECTRIC MOTOR-DRIVEN LIQUID PUMPS
Jørgen Aabye, Copenhagen, and Einar Ove Christensen, Søborg, Denmark, assignors to H. Hollesens Fabrikker A/S, Copenhagen, Denmark
Filed Oct. 11, 1960, Ser. No. 61,943
Claims priority, application Denmark Nov. 17, 1959
4 Claims. (Cl. 103—87)

The invention relates to electric motor driven liquid pumps, particularly circulation pumps for central heating plants and plants for supplying hot utility water, of the wet type where the rotor and stator of the electric motor are separated by a thin jacket.

In known pumps of the type referred to the shaft common to the rotors of the motor and the pump is either a conventional solid shaft, which is journalled in sleeve bearings in the pump casing or a tubular shaft journalled on a stationary supporting shaft. In order to obtain as far as possible a noiseless operation of the pump, it will be endeavoured to make the bearing play as small as possible, but this will often give rise to drawbacks, as impurities in the liquid to be pumped, such as rust, oxides, and scale precipitated in the pump may get jammed in the bearings, thereby blocking the rotor. In the case of circulation pumps installed in private houses such stoppages in the operation are particularly undesirable, as such installations do not normally have expert operators for attending to the plant. It is also difficult to provide a reliable location of the rotor shaft in the axial direction in the known pumps. Regular thrust bearings are liable to seize, and it has therefore been attempted to avoid direct contact between rotating and stationary components by means of various arrangements for hydraulic balancing of the axial forces acting upon the rotor unit. These arrangements are complicated and make the manufacture of the pumps more expensive.

The invention aims at overcoming the difficulties and drawbacks pointed out in the known pumps, and the characteristic feature of the invention consists in that the shaft common to the rotors of the motor and the pump is accommodated on conical pivot bearing subjected to an elastic axial pre-load.

Hereby is in a particularly simple and therefore cheap way attained an accommodation of the shaft by which the inclination of the latter to stick or bind due to impurities in the liquid to be pumped is considerably reduced, and hereby the reliability of the pump is increased. The comparatively high specific bearing pressure will effectively counteract the penetration of foreign matter, such as rust or scale between the bearings, and if such a foreign body should nevertheless succeed in making its way into the bearing, the bearing pressure will usually be capable of crushing it into a powder which is less inclined to block the shaft. As a foreign body, which possibly gets in, will act on a very small radius, its braking moment on the shaft will also be considerably smaller than would be the case in an ordinary journal bearing. The axial pre-load ensures that the contact in the bearings is preserved also in the case of variations in the length of the shaft.

According to the invention the magnitude of the axial preload may be adjustable, and hereby it will be possible to compensate for a strong wear, if any, in the bearings which might otherwise lead to an undesirable reduction of the contact pressure in the latter.

According to the invention the axial pre-load is conveniently provided by mounting the stationary part of one conical pivot bearing in an elastic diaphragm, while the corresponding part at the other end of the shaft is fixed in relation to the pump case. The diaphragm may advantageously be made so as to be dished in its unloaded state, and at the mounting it is deformed in the opposite direction somewhat beyond its plane state. By a suitable choice of the deformations of the diaphragm it is possible to attain that during the lifetime of the pump the position of the diaphragm—which position varies when the bearings are worn—is close to the plane position, which entails a minimum of diameter variation for the diaphragm and therefore allows the use of narrow tolerances between the diaphragm and the pump case. A good centering is therefore attained irrespective of the mobility of the bearing. When furthermore the diaphragm is located at that end of the pump where the pump is placed, the effect of the clearance between the diaphragm and the case on the centering of the rotor of the motor is additionally reduced.

By mounting a filling body, which fits tightly in the jacket and encloses the part of the pump shaft located between the rotor of the motor and the pump chamber so as to leave only a comparatively narrow slot, it is possible according to the invention to reduce the quantity of the liquid contained in the jacket and the circulation of the said liquid, so that the risk of foreign matter making its way from the liquid pumped to the bearing of the motor part and the slot between the rotor and the jacket is reduced.

According to the invention, the fixed bearing may be mounted at the end of a pin which is secured in the jacket between rotor and stator and which extends liquid-tight through the stator casing and has an axial bore, the outer end of which is closed with a venting member. In a preferred embodiment the pin is secured both to the end wall of the jacket and to a supporting wall which is secured in the jacket close to the rotor of the motor and has a through bore and the axial bore of the pin is in communication with the chamber between the end wall of the jacket and the supporting wall through at least one transverse bore. Hereby is attained for one thing an especially rigid support of the pin, in which the shaft is accommodated, and for another thing it is ensured that the bearing is lubricated by the liquid in the said chamber having access to the outer end of the bearing, which is of particular importance when the motor is started.

An indication of the rotation of the pump may in a simple way be achieved by the venting member being arranged for opening inwards and being provided with an extension which in the closed position of the member extends nearly to the end of the shaft, both this extension and the end of the shaft being cut off obliquely. By a slight inward displacement of the venting member, which entails only a slight loss of liquid, the end of the said member will get into contact with the end of the shaft, and when the latter rotates, this may be ascertained by the motion which it imparts to the venting member.

In another embodiment of the invention, the bearing surface of the pump shaft at one end of the shaft is formed by a truncated cone rotating in a corresponding internally conical bearing bush, and the shaft is provided with an extension which projects through the bearing bush and is visible through an opening in the stationary part of the pump. By this expedient the rotation and direction of rotation of the pump shaft can be controlled from the outside without any dismantling of components which might entail a loss of liquid.

According to the invention, the extension of the shaft may furthermore be provided with means for turning the shaft from the outside through an opening in the stationary part of the pump. If the shaft should happen to bind or get stuck, it is hereby possible to turn it manually and possibly eliminate the reason for the sticking of the shaft without dismantling the pump completely. The bearing bush is preferably mounted in the middle of an annular, resilient diaphragm which has a substantially liquid-tight contact against the bearing bush and the stationary part of the pump, respectively. Hereby access to the extension of the shaft is ensured without risk of substantial los of liquid from the pump.

According to the invention, the stationary as well as the rotary components of the bearings may be made from cemented carbides. Hereby a good wear resistance is obtained, which ensures a suitable lifetime for the bearings with comparatively small dimensions of the latter.

The invention will in the following be further described with reference to the diagrammatical drawings in which FIG. 1 shows a side elevation, partly in section, of a preferred embodiment of the pump according to the invention, FIG. 2 a corresponding illustration of a modified embodiment, FIG. 3 a section through a modified embodiment of one shaft bearing for the pump shown in FIG. 1, and FIG. 4 a section through a modified embodiment of one shaft bearing for the pump shown in FIG. 2.

The pump shown in FIG. 1 comprises a casing 1 which in the usual manner is provided with an inlet flange and an outlet flange, with which the pump can be assembled with corresponding flanges on the pipe system of the plant. The inlet opening of the pump is designated by 2, and its outlet opening by 3. The pump is provided with a rotary impeller or vane wheel 4 secured to a shaft 5 which likewise carries a rotor 6 for the pump motor; which is shown purely diagrammatically, as its electrical design is irrelevant to the invention.

The stator packet or core 7 of the electric motor is mounted inside a stator casing 8 which is shown diagrammatically as having a terminal box 9 and which is secured detachable to the pump casing 1, fitting with a cylindrical recess over a collar on the casing 1. The stator casing is held in place by means of grub screws 10. The internally cylindrical stator 7 fits tightly over a jacket 11 which separates the stator 7 from the rotor 6. The jacket 11 is tightly secured to an intermediate ring 12 screwed into the pump casing 1. In the zone between the stator 7 and the rotor 6 the jacket has a very small thickness out of regard to the attainment of small electrical and magnetical losses in the gap.

Each end of the shaft 5 is accommodated in the stationary part of the pump by means of a finely-ground pivot point 13 and 14, respectively, which are expediently formed by inserts of cemented carbide secured in the end of the shaft. The pivot point 13 co-operates with a bearing bush 15, preferably likewise of cemented carbide, which is provided with an internally conical bearing seat and which is secured in the centre of a cruciform, dished, elastic diaphragm 16 placed in the bottom of the pump case 1. The pivot point 14 likewise co-operates with an internally conical bearing seat in an insert 17 which is secured in the end of a cylindrical, bored-through pin 18 is connected so as to be liquid-tight, e.g. by soldering, to the end wall 11a of the jacket 11. In order to further ensure the true centering of the pin 18 in relation to the jacket 11, said pin is secured to an intermediate plate 19 which fits tightly inside the jacket 11 and is located immediately above the rotor 6. The pin 18 is furthermore guided by a cylindrical bore 20 in the end wall 8a of the stator casing 8.

The length of the shaft 5 is adjusted so that the diaphragm 16 exerts a suitable axial pressure on the shaft. For circulation pumps of the sizes which are generally used in central heating and hot water installations, an axial pressure of about 2–10 kg., when the pump shaft is mounted, has turned out to be satisfactory. The diaphragm 16 is manufactured in such a way that in its unstressed state it is dished in the direction opposite to that shown in FIG. 1, and when being mounted the diaphragm is pressed beyond its plane position in such a way as to take up the mounted position shown, where, incidentally, its curvature is shown exaggerated for the sake of clarity. In practice, the convexity will amount to only about 1 mm. As the normal wear of the bearings during the lifetime of the pump will hardly ever exceed about 2 mm., the diaphragm 16 will even after a long time remain almost plane, so that its outer diameter is only altered insignificantly. This means that the diaphragm can be mounted with a comparatively small diameter clearance in the casing 1, and as the diaphragm is furthermore located opposite to that end of the shaft 5, where the rotor 6 of the motor is mounted, the centering of the said rotor in relation to the stator 7 is only affected very little by the motion and clearance of the diaphragm.

The pin 18 is provided with a central through bore 21 which at its top is closed with a vent screw 22. Transverse bores 23 in the pin 8 establish communication between the bore 21 of the latter and the space between the bottom 11a of the jacket 11 and the intermediate plate 19, and through perforations, not shown, in the plate 19 this space is furthermore in communication with the liquid-filled space inside the jacket 11, where the rotor 6 is located. In this way, the supply of lubricating liquid to the outer end of the pivot point 14 is always ensured. In order to prevent liquid from leaking into the stator casing 8 in the case of venting of the pump by means of the screw 22, a sealing ring 24 is mounted between the pin 18 and the bore 20.

In the intermediate part 12 a filling body 25 has been pressed in, which may be made of e.g. low-pressure polyethylene and which takes up the greater part of the space between the rotor 6 of the motor and the pump chamber proper. A labyrinth sealing between the filling body and the shaft 5 is effected by labyrinth chambers 26 in the filling body. The filling body serves for reducing the quantity of liquid around the rotor 6 and the circulation of this liquid, whereby the risk of foreign matter making its way from the liquid pumped to the shaft bearing 14, 17 and to the gap between the rotor 6 and the jacket 11 is reduced.

It has turned out that a pump with conical pivot bearings like that here described is very reliable as a circulation pump even in plants for supplying hot utility water, in which due to the constant supply of fresh water from the mains, considerable precipitations of scale may occur. In contradistinction to pumps with ordinary cylindrical sleeve bearings, the risk of blocking or jamming of the rotor due to depositions in the bearings is reduced. A blocking of the rotor may, however, also occur due to the fact that scale or other foreign matter gets jammed in the narrow slot between the rotor 6 and the jacket 11. It may therefore be convenient to provide e.g. in the diaphragm 16 an opening, through which a tool for turning the rotor shaft 5 may pass. Such a tool may e.g. comprise a shaft passing liquid-tight through a stuffing box in the bottom of the pump case 1 and which on its inner end carries a gear wheel which can be made to mesh with teeth on the rotor shaft or on the pump wheel 4. The shaft may be spring-loaded in such a way that normally the teeth on the two members do not mesh, but that the shaft can be shifted axially against the spring pressure and thereby establish the meshing of the teeth.

In the embodiment shown in FIG. 2, the pump casing is designated by 31, and its inlet and outlet openings by 32 and 33, respectively. The impeller 34 of the pump is secured to the shaft 35 which carries the rotor 36 of the pump motor.

The stator packet or core 37 of the motor is mounted in the stator casing 38 which by means of screws 39 is secured to an annular flange 40 which by means of bolts, not shown, is secured detachably to the pump case 31. In this embodiment the jacket 41, which separates the stator 37 and the rotor 36, is a cylindrical tube which at its end nearest the pump casing is secured by rolling in the end flange 40, there being as a further means of preventing liquid from leaking from the interior of the pump to the stator casing mounted on O-seal 42 between the bore in the flange 40 and the jacket 41.

At its outer end, the jacket 41 is assembled liquid-tight, e.g. by soldering, with an end part 43 provided with an internal shoulder 44. A circular diaphragm 45 rests with its outer edge on the shoulder 44, and the diaphragm is provided with a central bore in which a collar bush 46, which is closed at the end, is mounted with its collar resting on the underside of the diaphragm 45. A finely ground pivot point 47 of cemented carbide is secured in the bore of the bush 46.

A pivot holder 48 is secured liquid-tight in the bottom of the pump case 31, and a finely ground pivot point 49 is mounted in a bore in the pivot holder 48 opposite to the pivot point 47. The pivot points 47 and 49 serve for accommodating the rotor shaft 35 which is at either end provided with a cylindrical recess into which an insert 50 of cemented carbide or other hard material is let. Each of the two inserts 50 is provided with an internal, conically ground bearing seat which can accommodate the corresponding conical bearing seats on the pivot points 47 and 49.

Consequently, the embodiment shown in FIG. 2 differs from that shown in FIG. 1 in that the internally conical bearing seats are provided in the shaft, while the pivot points are secured in the pump casing and in the diaphragm mounted at the end of the jacket, respectively. As was the case with the pump wheel 4, the pump wheel 34 is mounted with its suction side facing the fixed bearing, so that the pressure difference produced by the pump wheel in the two chambers of the pump casing actuates this wheel and thereby the shaft in the direction towards the fixed bearing. This embodiment may, as was the case with that described above, be provided with members for turning the pump shaft from the outside, e.g. a toothed shaft as described above, and this shaft may then extend liquid-tight through the end part 43 and through an opening in the diaphragm 45.

FIG. 3 shows a modification of the accommodation of the shaft shown in FIG. 1 at the upper end of the pump. In the pump shaft 55, which is shown in section, there is fixed a pivot point 56 which at its end is provided with an oblique face 57. The internally conical bearing seat 58 is mounted in a cylindrical pin 59 corresponding to the pin 18 in FIG. 1. The pin 59 is secured in the end plate 60 of the jacket corresponding to the end plate 11a in FIG. 1 and in the intermediate wall 61 corresponding to the intermediate wall 19 in FIG. 1, and the pin is furthermore guided in a bore 62 in the end wall 63 of the stator casing.

Instead of the vent screw 22 in FIG. 1 there is provided in FIG. 3 a valve body 64 with a cylindrical portion which is mounted with a play in the cylindrical bore of the pin 59 and which has a conical valve face 65 co-operating with a valve seat at the transition between the said cylindrical bore in the pin 59 and an extension of this bore having a smaller diameter. The portion of the valve 64 following upon the valve face 65 is threaded and co-operates with a nut 66 which is shown countersunk into the bore 62. The opposite end of the valve 64 is shown cut off obliquely at 67.

Normally the nut 66 is tightened, so that the valve face 65 is held against its seat. The venting of the pump is effected by the nut 66 being slackened, whereby the valve permits air, if any, to escape. If the nut 66 is further slackened, the valve 64 sinks, and at last its obliquely cut-off end face 67 gets into contact with the oblique end face 57 of the pivot. Hereby it is possible without dismantling the pump to ascertain whether the shaft of the latter rotates, as in this case the valve 64 will be moved up and down, its turning being prevented by a forced-in pin 68 engaging a guided groove 69 in the pin 59. Leakage of liquid to the interior of the stator casing is prevented during this operation and during the venting by means of a sealing ring 70 between the pin 59 and the bore 62 in the stator casing.

FIG. 4 shows a modified embodiment of the upper bearing in the pump shown in FIG. 2. In this embodiment, the bearing face of the pump shaft is formed by a truncated cone, and the shaft is provided with an extension which projects through the associated bearing bush and which is visible through an opening in the stationary part of the pump and which furthermore is provided with members which make it possible in case of need to turn the shaft from the outside.

The figure shows a part of the stator casing 81 of the pump in which the stator packet 82 is mounted. The shaft 83 of the pump, which carries both the pump rotor, not shown, and the rotor 84 of the electric motor, has a cylindrical portion 85 which is located outside the said rotor 84 and to which an externally conical bearing ring 86 of cemented carbide or other hard material is secured.

The bearing ring 86 is externally ground with a vertex angle of about 60°, and it is rotatable in a bearing bush 87 which is likewise of cemented carbide or other hard material and provided with a corresponding conical face. A collar on the bearing bush 87 rests against the side facing the rotor 84 of a closed annular diaphragm 88, the outer periphery of which rests against an internal shoulder on an end part 89. The end part 89 is liquid-tight connected to the thin cylindrical jacket 90 which separates the rotor 84 of the electric motor from the stator 82, fitting tightly in the cylindrical bore of the latter. The end part 89 is provided with a hollow, externally cylindrical, upwards facing extension 91 which projects through a corresponding bore in the stator casing 81 and which externally is closed by a screwed-on cover 92 which is preferably completely or partly transparent.

The pump shaft 83 is provided with an extension 93 which projects into the cylindrical part 91 of the end part 89 and the outer end of which is square. Consequently, the end of the shaft is visible from the outside through the cover 92, and when the latter is removed, the end of the shaft may be turned manually, if for some reason it happens to bind or get stuck by applying a spanner to its square.

As was the case with the diaphragm 16 and 45 in the embodiments described above, the diaphragm 88 serves as a resilient member exerting a suitable axial pressure on the shaft 83. When the diaphragm and the corresponding faces on the bearing bush 87 and the end part 89, respectively, on which the diaphragm abuts, is suitably designed, the liquid-filled space inside the jacket 90 will be substantially liquid-tight closed in relation to the space outside the diaphragm 88, so that the cover 92 can be removed without perceptible quantities of liquid leaking out.

The axial pre-load of the rotor shaft may instead of being effected by an elastic diaphragm be provided by means of other elastic members, e.g. helix springs or leaf springs.

What we claim is:

1. A liquid pump comprising a casing having a first chamber and a second chamber, a liquid tight jacket separating said chambers, an electric motor comprising a stator located in said second chamber and a rotor located in said first chamber, a rotary shaft carrying said motor rotor, a pump impeller secured to said shaft, a diaphragm supported at its periphery by said casing at one end of said first chamber, a first stationary bearing member secured to said diaphragm and having a tapered bearing surface shaped for supporting said shaft in co-operation with a first tapered bearing surface on said shaft, a pin secured liquid tight to said jacket at the opposite end of said first chamber and to the adjacent end of said casing and extending into said first chamber, a second stationary bearing member secured to the end of said pin extending into said first chamber and having a tapered bearing surface shaped for supporting said shaft in cooperation with a second tapered bearing surface on said shaft, said pin having an axial passage extending lengthwise thereof, and an axially displaceable venting member normally obstructing the outer end of said passage.

2. A liquid pump as claimed in claim 1, in which said venting member is arranged for opening such passage upon an inward displacement, and said venting member is provided with an axial etxension which in the closed position of said venting member extends nearly to the end of said shaft supported in said second stationary bearing member, the opposing end faces of said extension and said shaft being cut off obliquely with respect to the axis of said shaft.

3. A liquid pump as claimed in claim 1, in which an apertured wall is secured to said jacket adjacent said motor rotor and to said pin, and in which at least one transverse bore is provided in said pin communicating with said axial passage intermediate said apertured wall and the outer end of said jacket.

4. A liquid pump comprising a casing having a first chamber and a second chamber, a liquid tight jacket separating said chambers, an electric motor comprising a stator located in said second chamber and a rotor located in said first chamber, said first chamber having an inlet and outlet for passing liquid therethrough, a rotary shaft carrying said motor rotor and disposed in said first chamber, a pump impeller in said first chamber secured to said shaft between said inlet and outlet, a cup shaped resilient diaphragm supported at its periphery by said casing disposed in said first chamber, a first stationary bearing member secured centrally to said diaphragm with a conical tapered bearing for supporting the adjacent end of said shaft in cooperation with a complementary first tapered bearing surface on said shaft, a second stationary bearing secured centrally of said liquid tight jacket with a conical tapered bearing for supporting the adjacent opposite end of said shaft in cooperation with a complementary second tapered bearing surface on said shaft, said resilient diaphragm providing an axial preload upon said shaft.

References Cited in the file of this patent

UNITED STATES PATENTS

| | | |
|---|---|---|
| 1,447,587 | Calvert | Mar. 6, 1923 |
| 2,004,866 | Haldeman | June 11, 1935 |
| 2,429,114 | Whitted | Oct. 14, 1947 |
| 2,460,371 | Szwargulski | Feb. 1, 1949 |
| 2,468,187 | Ericson | Apr. 26, 1949 |
| 2,766,695 | Gailloud | Oct. 16, 1956 |
| 2,807,395 | Korte | Sept. 24, 1957 |
| 2,928,588 | Sudmeier | Mar. 15, 1960 |
| 2,939,399 | Rutschi | June 7, 1960 |
| 2,987,638 | Lux | June 6, 1961 |